Aug. 11, 1942.  F. H. HOGE  2,292,690
DUPLEX DELIVERY GEAR TRANSMISSION AND THE LIKE
Filed Oct. 26, 1940    4 Sheets-Sheet 1

Inventor.
Frederick H. Hoge,
by
Atty.

Aug. 11, 1942.  F. H. HOGE  2,292,690
DUPLEX DELIVERY GEAR TRANSMISSION AND THE LIKE
Filed Oct. 26, 1940  4 Sheets-Sheet 4

Inventor:
Frederick H. Hoge

Patented Aug. 11, 1942

2,292,690

UNITED STATES PATENT OFFICE 2,292,690

DUPLEX DELIVERY GEAR TRANSMISSION AND THE LIKE

Frederick H. Hoge, Oak Park, Ill.

Application October 26, 1940, Serial No. 362,919

8 Claims. (Cl. 74—425)

This invention relates to improvements in gear transmissions and the like, and especially to what I may call a "duplex delivery" transmission, that is, a transmission so constructed that power delivery may be effected to two distinct devices, from a single power input. The construction herein disclosed, and particularly shown and described herein, is especially intended for use in connection with the driving of pull heads for wire drawing stands, and the like, but it will presently appear that said features are not limited in their usefulness to this particular or any other application. Nevertheless, I have herein shown and shall particularly describe such an application, since the structure herein illustrated is especially intended to meet the conditions of such a use and application, but in so doing I wish it understood that I do not thereby limit myself, except as I may do so in the claims to follow.

In wire drawing mills it frequently is the case that a number of pull heads or blocks are located in alignment with each other, so that power for driving the same must be delivered along such line, and from such line to each such pull head. Furthermore, it frequently is the case that such row is a double row, including pull heads at both sides thereof and facing in opposite directions. Provision must be made for the driving of all such pull heads facing in opposite directions. Furthermore, provision must be made for individually cutting each pull head into or out of service as desired, and without interference or disturbance to any of the other pull heads of the line.

In the driving of these pull heads it is also frequently the practice to drive the line from a common drive unit, such as a motor operating through a suitable form of gear reducer or by direct drive. When this is done the driving motor or reducer unit acts to drive one end of the line, and the various pull heads are connected to such line by means of suitable gear drive units. This invention concerns itself with such a gear drive unit.

One object of the invention is to provide such a gear drive unit so constructed that from a single input line or shaft extending through the unit, there may be taken two output connections one for each pull head, said output connections being opposed to each other, that is, one at each side of the device. Then a series of such duplex units may be connected up in alignment with each other, by suitable connections, such as flexible couplings, so that the input power is transmitted from the motor drive unit to said complete line, and at the location of each such duplex unit power for one or both (or neither) of said pull heads is taken off, and the power for the pull heads further along the line is delivered through and past such duplex pull head in question.

One feature of the invention relates to the means whereby the power for the two pull heads of a unit is taken from such line drive. In this connection it is an object to provide a very simple and sturdy construction of device. Now at this point it is noted that the line shaft section contained within a given unit must be suitably journalled within said unit. Such journalling is preferably by means of suitable anti-friction bearings such as roller bearings or the like. Furthermore, it is noted that when such a unit is placed in service its temperature rises due to heating of the various parts. Such rise of temperature necessarily results in expansion of the line shaft section contained within the unit; and in case this line shaft section is long this expansion makes necessary the provision of a special bearing arrangement to take up such expansion. In such case, one end of the line shaft section must be anchored or fixed by use of a thrust bearing, and a special "floating" type of bearing must then be provided for the other end of such line shaft section to provide for such expansion and contraction with temperature changes.

One object of the present invention is to make provision for delivery of the drives to both of the pull heads of the "duplex" arrangement in such manner that a very short line shaft section may be used, much shorter, in fact, than has heretofore been possible in any "duplex drive" heretofore known to me. By this means I have made it possible to use a construction wherein both of the bearings for the line shaft section may be of the fixed type, since the expansion and contraction with temperature changes are so small that it is unnecessary to make provision for "floating" one end of the shaft. By this means it is possible to make use of much simpler bearings, and bearings of smaller overall dimensions, and much lower cost than has heretofore been possible in this type of device.

A further feature of the present invention relates to the construction and arrangement of the means for driving the pull head shafts or stems from the single worm gear to which the line shaft section delivers its power in the unit in question. In this connection it is here noted that I have used an arrangement wherein the two pull heads and their shafts or stems are placed in alignment with each other and generally at right angles to the direction of the line drive shaft section. In this connection I have provided an arrangement wherein such worm gear takes the form of a spider or quill which is quite short measured across the duplex unit. By this means I have made it possible to also make use of fixed or thrust bearings for both ends of this spider or quill, and without the need of using a "floating" bearing for either end thereof; likewise with considerable improvement in simplicity of construction, and reduction of size and cost of the parts.

This spider or quill serves to drive either or both of the shafts or stems for the two pull heads at the sides of the unit. In this connection I have provided a very simple arrangement for journalling these two stems, likewise without the need of provision for "floating" either bearing of each stem, since they are also so short that such provision is not necessary. In this connection it is a further feature of the invention that each such stem is so designed and arranged that the pull head thereof may be brought substantially in alignment with the main bearing of such stem. By this means it is possible to largely avoid lateral twisting tendency of the pull head stem, that is, lateral force thereon, since only a small turning moment is present in this construction. It is therefore possible to make use of a comparatively small bearing for the inner end of each of these pull head stems. Such inner bearing serves merely to maintain alignment of the stem, but in reality carries practically no load. It is here noted that when the pull head is clutched to the worm gear the stem is rotating with such worm gear, and under these conditions there is no rotation at the position of such small inner bearing. This bearing then serves merely to maintain alignment of the parts, and carries no bearing load. On the other hand, when the pull head is unclutched from the worm gear, so that the pull head is idle, said pull head is then calling for no power, and this small inner bearing has substantially no load to carry, although it is rotating.

It is further noted that when in service there is an end thrust created by the action of the wire on the pull head, such end thrust tending to force the pull head inwardly; and a further feature of the present construction is that such end thrust of one pull head when in service is balanced by the end thrust of the other pull head; whereas when only a single pull head is in service the end thrust thereof is transmitted to the main bearing of the other pull head and carried thereby.

A further feature of the present invention relates to the provision of a construction such that the line shaft section and the spindle or spider of the worm gear may be assembled into the base or main frame section of the unit, and brought to adjustment of the bearings of these parts, the cover section being removed from the unit. The arrangement is also such that the shafts or stems of the pull heads may be readily set into the said spindle or quill endwise, after such previous assembly of the worm gear spindle section to the base section, and thereafter the cover section may be set and secured to the base section, thereby completing the bearing supports for the pull head shafts or stems.

A further feature of the invention is the provision of means to clutch each pull head shaft or stem directly to the worm gear element or spider or quill. By this means the transmission of the relatively large torque from the worm gear or spider or quill to the pull head shaft or stem is effected in very direct and short drive, and under conditions most conducive to good operating results over a long period of time. Furthermore, this arrangement serves to ensure transmission of such large torque without lateral force in the pull head shaft or stem or on the bearings thereof.

Generally, it may be stated that an object is to provide a very simple form and construction of such device, one which can be brought into comparatively small compass, one having a small number of relatively simple bearings, one having relatively short shaft or unit sections, one in which the large forces are brought into balance when the device is being used on both sides under load, one in which the large forces are well taken care of when only one side or pull head is in use, one which may be built and assembled under conditions advantageous for excellent construction and adjustment of parts, one in which either or both pull heads may be readily removed and replaced or reset without disturbance to the main operating parts of the device, and one having other features of improvement in devices for this and similar operations.

Other objects and uses of the invention will appear from a detailed description of the same, which consists in the features of construction and combinations of parts hereinafter described and claimed.

Figure 1:
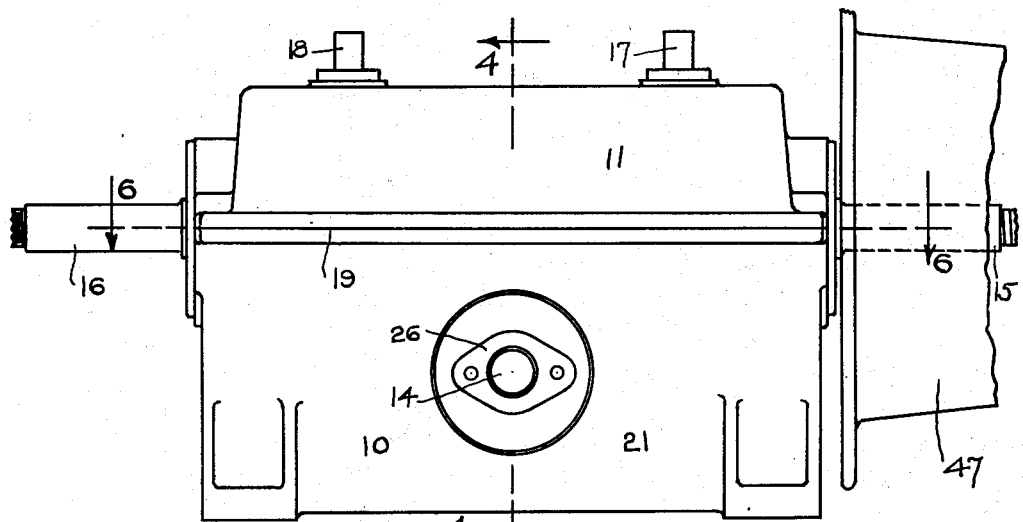
Figure 1 shows a side elevation of a unit embodying the features of my present invention.
Figure 2:
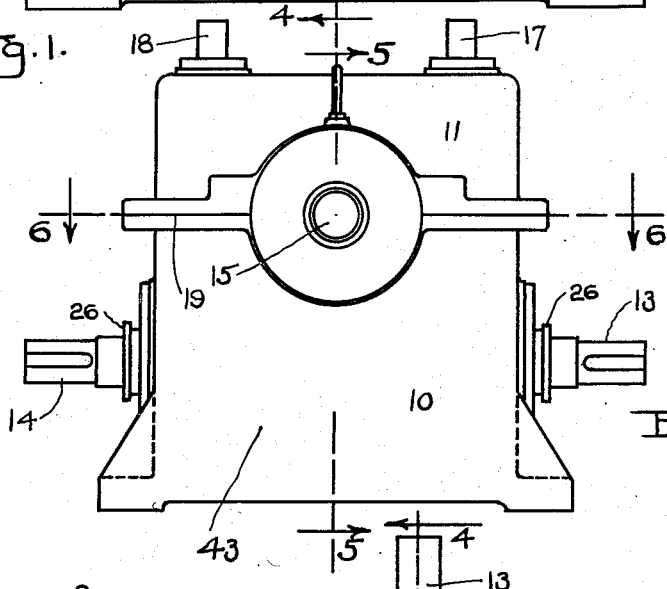
Figure 2 shows an end view corresponding to Figure 1.
Figure 3:
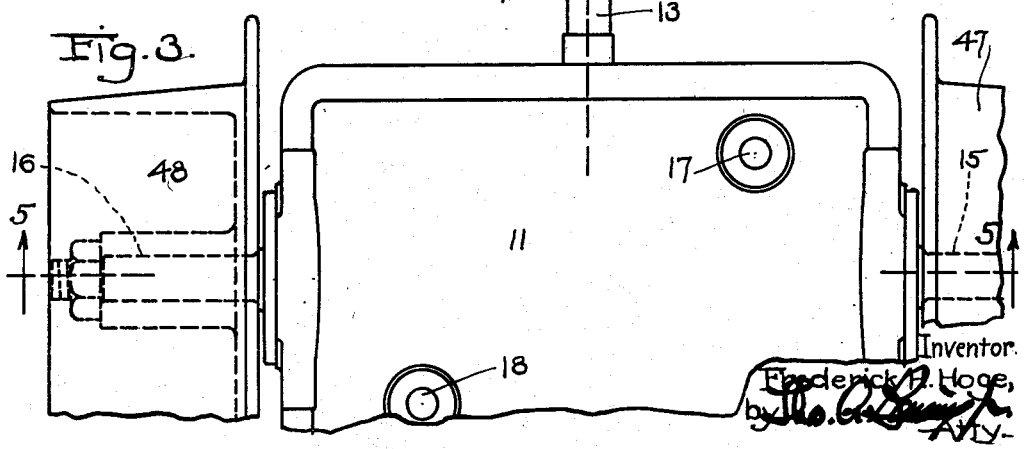
Figure 3 shows a top or plan view corresponding to Figures 1 and 2.

Referring first to Figures 1, 2 and 3, the unit therein illustrated includes the base section 10 and the cover section 11, which together provide the housing for the elements, and also serve to carry the bearings for the principal operating parts. The line shaft section 12 extends through this base section wherein it is suitably journalled as will presently appear; and said line shaft section is provided with the end stems 13 and 14 to receive flexible coupling elements whereby the unit in question is coupled to similar units constituting a portion of the entire line of the drive. The unit in question is also provided with the shafts or stems 15 and 16 for the two pull heads, these being at right angles to the line shaft sections and located above them or at higher elevation, for reasons which will presently appear. This unit also has the two rock shafts 17 and 18 extending vertically, and adapted to receive suitable handles or levers for operating by handles or links. These are for operation of the individual clutches of the two pull head shafts or stems, as will presently appear hereinafter.

It is noted that the cover section is parted from the base or main housing section at the horizontal plane 19 in Figures 1 and 2, and that these two sections may be readily connected together or disconnected at this plane.

Figure 4:
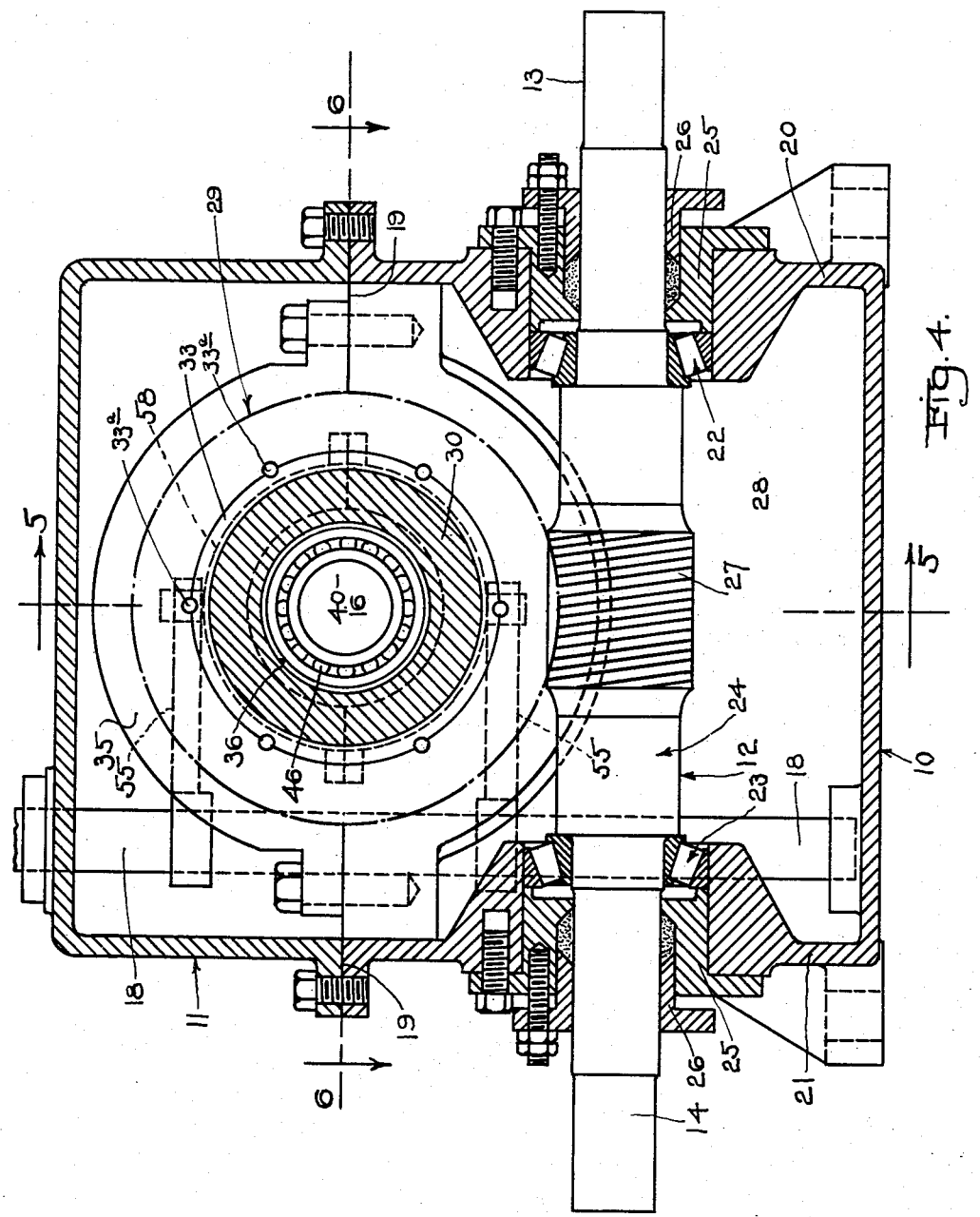
Figure 4 shows a cross-section through the unit of Figures 1, 2 and 3, on enlarged scale.
Figure 5:
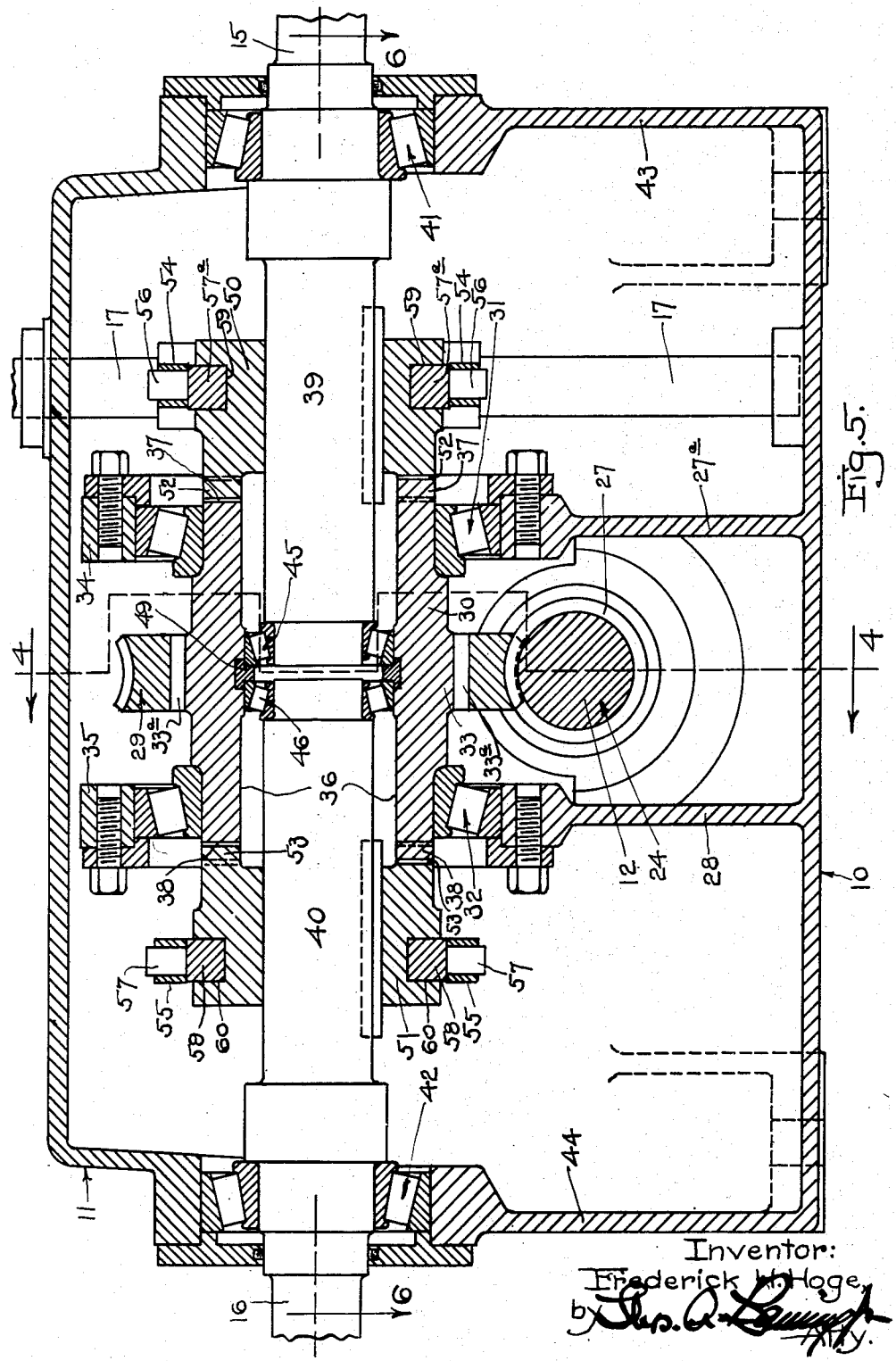
Figure 5 shows a longitudinal section through the unit of Figures 1, 2 and 3, also on enlarged scale, being a section on the line 5—5 of Figure 4, looking in the direction of the arrows.
Figure 6:
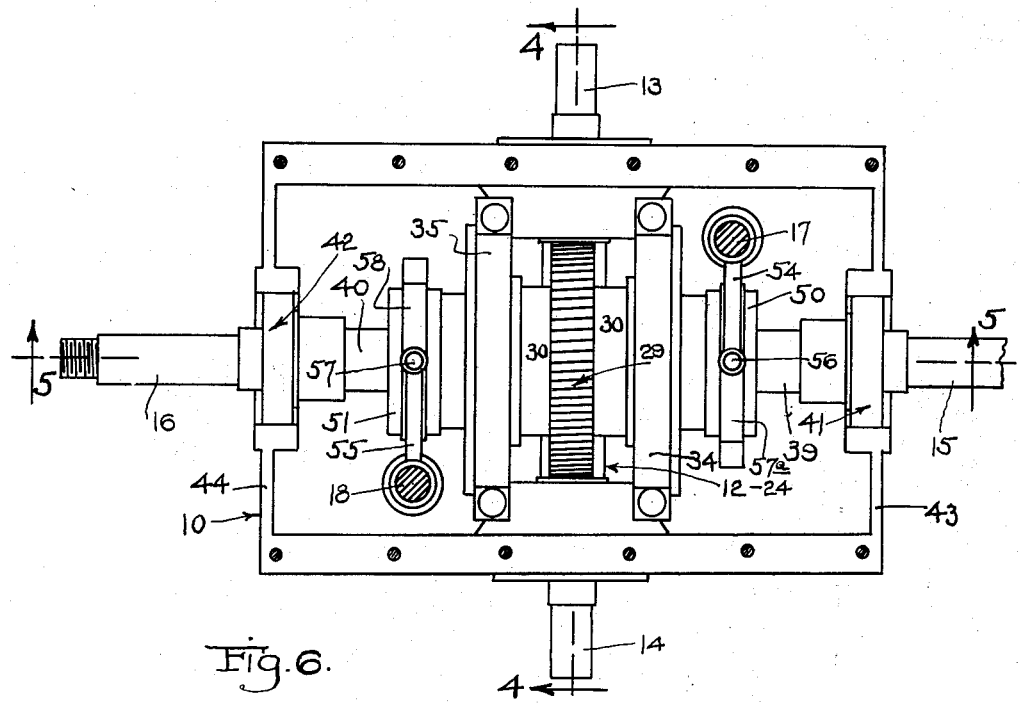
Figure 6 shows a plan view corresponding to Figure 3, but with the cover section removed from the unit.

Referring now to Figures 4 and 5, the end walls 20 and 21 of the base section 10 are provided with the aligned roller bearings 22 and 23 for carrying the short line shaft section 24; and it is here noted that this line shaft section is so relatively short that both of these bearings may be of the "locked" type, that is, of construction locking the shaft against endwise movement. Each of these bearings includes the follower block 25 which is drawn to a tight or locked position and against suitable shims, so that the bearing is locked in place under the proper roller clearance. If desired, a suitable packing gland 26 may be provided for each of these bearings, so that when the unit is operated with oil therein to a level high enough to submerge the bearings 22 and 23 leakage of such oil will be effectively prevented.

Now it will be noted that this short shaft section has the worm 27 formed in its central portion. Still this worm section is of a size which may be passed through the openings in the base section, so that this line shaft section may be assembled endwise into the base section from either end. This will facilitate replacement or adjustment of the line shaft section from either direction if need be.

Extending across the base section there are the two webs or flanges 27ª and 28. These reach approximately to the elevation of the parting plane 19 already referred to; and these webs are adapted to receive and support the bearings for the worm gear or spider or quill section. This worm gear is shown at 29. It is carried by the spider or quill 30 which is relatively short and sturdy; and the ends of this spider or quill are journalled in the roller bearings 31 and 32. These roller bearings are carried by the webs already referred to; and since the spider or quill is relatively short these bearings 31 and 32 may both be of the "locked" type, since it is not necessary to float either end of this element. Furthermore, the worm gear 29 may either be made integral with this spider or quill, or it may constitute a separate ring section of bronze, for example, shrunk and pinned by the pins 33ª to the flange 33 of the spider or quill proper. Constructions of this type are well known in this art.

Each of the bearings 31 and 32 is locked in place by the removable cover section 34 or 35, as the case may be; so that this worm gear element may be set into place and its bearings be brought to adjustment while the cover section 11 is removed from the unit. This is desirable since the worm gear element is driven constantly while power is being transmitted to or through the unit in question, and it is desirable to ensure close adjustment of these parts.

Now this spider or quill is hollow, being provided with the through bore 36; and the ends of the quill are provided with the clutch portions 37 and 38, respectively. These clutch portions may be of any suitable type, either of the jaw type as shown, or of the internal-external gear type which is well known in the art.

The spider or quill element is adapted to receive the inner end portions of the two shafts or stems 39 and 40 for the two pull heads or other elements which are to be driven by this duplex drive. Each of these shafts or stems is carried by a main roller bearing, being the bearings 41 and 42, of the locked type or thrust type; and each of these bearings is supported by the semi-support formed in the side wall 43 or 44 as the case may be. The cover section 11 forms the top halves of these bearing supports to secure the same in place when such cover section is set and secured in position on the base section. The inner end of each of the pull head shafts or stems is carried by a small roller bearing, being the bearings 45 and 46. It is to be noted that the pull heads 47 and 48 are set and keyed to the projecting portions 15 and 16 already referred to, and since these pull heads are close to the main bearings 41 and 42 there is but little lateral thrust transmitted to the bearings 45 and 46. These bearings therefore serve principally to maintain alignment of the pull head shafts or stems at all times. Furthermore it is noted that when each shaft or stem 39 or 40 is clutched to the spider or quill, such shaft or stem rotates with the spider or quill, and under these conditions the inner and outer races of the bearing 45 or 46, as the case may be, do not rotate with respect to each other, but these bearings then serve merely as a means to maintain alignment of the parts. Then, when each pull head shaft or stem is unclutched from the spider or quill, so that such shaft or stem stands stationary, there is only an idling load thereon, so that under these conditions the bearings 45 and 46, although rotating, are doing so substantially without load.

Now it is noted that when either pull head is clutched to the spider or quill there is created an end thrust on the shaft or stem 39 or 40, as the case may be, tending to force the same inwardly, and against the inner bearing 45 or 46. I have shown a ring 49 between the outer races of these bearings. In case said ring is not secured to the spider or quill there may be transmission of such end thrust from one bearing 45 or 46 to the other such bearing, and thence through the shaft or stem to the other main bearing 41 or 42, as the case may be. I prefer, however, to lock the ring 49 against such endwise movement. Such locking may be effected either by pinning the ring to the spider or quill; or by sectionalizing the ring, and seating it into a shallow groove or channel in the spider or quill, with the raceways of the two bearings 45 and 46 overlying such ring sections as shown in Figure 5. Other expedients may also be used. By so locking the ring the end thrust of either pull head is localized to the shaft or stem thereof.

Provision is made for clutching either of the shafts or stems 39 and 40 to the corresponding end of the spider or quill. In the construction illustrated this clutching means takes the form of the two clutch blocks 50 and 51 splined to the respective shafts or stems 39 and 40, and provided with the clutch faces 52 and 53 adapted to engage the clutch faces 37 and 38 of the spider or quill. These clutch blocks 50 and 51 may be shifted in any convenient manner. The arrangement shown includes the arms 54 and 55 carried by the rock shafts 17 and 18 previously referred to. These rocks shafts are journalled in the cover section 11 and the base section 10. The arms 54 and 55 carry the pins 56 and 57 which engage the rings 57ª and 58, said rings being located in the grooves 59 and 60 of the respective clutch blocks. These rock shafts may be rocked in any convenient manner, as by links connected to arms carried by the projecting ends of the rock shafts, or suitable handles connected to the projecting ends of the shafts for a like purpose.

Where in the specification and claims I use the expression "worm" or "worm gear" or similar expressions it will be understood that I contemplate as being within the scope of my invention and within the scope of the claims, any gearing arrangement for driving between two shafts which are other than parallel to each other. For example, I contemplate spiral gears, hypoid gears, and other arrangements of non-parallel shafts located in different planes from each other.

Where I use in the specification and claims the expression "transversely" or similar expressions with respect to the line shaft section and the axis of the "worm gear" or similar gear, I contemplate any arrangement in which the said parts do not lie in the same plane.

I claim:

1. In a device of the class described, the combination of a quill, a worm gear thereon, means to journal the end portions of the quill at points close to the worm gear, said journal means comprising "locked" anti-friction bearings, pull head shaft sections extending axially into said quill from both ends thereof, anti-friction bearings for said shaft sections at locations outside of the quill, anti-friction bearings for the inner ends of said shaft sections close to each other within the quill, means to clutch said shaft sections to the adjacent ends of the quill or to disengage therefrom, together with means to drive the worm gear, comprising a line shaft section extending transversely of the quill axis, a worm thereon meshing with the worm gear, and means to journal said line shaft section, comprising "locked" anti-friction bearings relatively close together, substantially as described.

2. In a device of the class described, the combination of a quill, a worm gear thereon, means to journal the end portions of the quill at points close to the worm gear, pull head shaft sections extending axially into said quill from both ends thereof, bearings for said shaft sections at locations outside of the quill, bearings for the inner ends of said shaft sections close to each other within the quill, means to clutch said shaft sections to the adjacent ends of the quill or to disengage therefrom, together with means to drive the worm gear, comprising a line shaft section extending transversely of the quill axis, a worm thereon meshing with the worm gear, and means to journal said line shaft section, comprising bearings relatively close together, substantially as described.

3. The combination, in a device of the class described, of a quill, a worm gear thereon, means to journal the end portions of the quill at both sides of the worm gear, pull head shaft sections extending axially into said quill from both ends thereof, bearings for said shaft sections at locations outside of the quill, bearings for the inner ends of said shaft sections within the quill, means to clutch said shaft sections to the adjacent ends of the quill or to disengage therefrom, together with means to drive the worm gear, comprising a line shaft section extending transversely of the quill axis, a worm thereon meshing with the worm gear, and means to journal said line shaft section, comprising bearings at opposite sides of the said worm, substantially as described.

4. In a device of the class described, the combination of a quill, a worm gear thereon, means to journal said quill comprising "locked" bearings at both sides of the worm gear and relatively close together, whereby both of said bearings may be of the "locked" type, pull shaft sections extending into the quill from both ends thereof, bearing means for said shaft sections, comprising anti-friction bearings located at locations outside of the quill, and other anti-friction bearings within the quill for the inner ends of said shaft sections, clutch means between each end of the quill and the adjacent shaft section anti-friction bearing, for clutching said shaft section to the quill, or for disengagement therefrom, together with means to drive the worm gear, comprising a line shaft section extending transversely of the quill axis, a worm thereon meshing with the worm gear, and means to journal said line shaft section, comprising "locked" bearings at opposite sides of said worm and relatively close together, whereby both of said bearings may be of the "locked" type, substantially as described.

5. In a device of the class described, the combination of a quill, a worm gear thereon, means to journal said quill comprising bearings at both sides of the worm gear, pull shaft sections extending into the quill from both ends thereof, bearing means for said shaft sections located at locations outside of the quill, other bearing means for said shaft sections within the quill, clutch means between each end of the quill and the adjacent shaft section bearing, for clutching each shaft section to the quill, or for disengagement therefrom, together with means to drive the worm gear, comprising a line shaft section extending transversely of the quill axis, a worm thereon meshing with the worm gear, and means to journal said line shaft section, comprising bearings at opposite sides of said worm, substantially as described.

6. In a device of the class described, the combination of a base section, a line shaft section extending transversely of said base section and fully journalled therein, a worm on said line shaft section, a quill above said line shaft section and worm, and extending transversely with respect thereto, a worm gear on said quill meshing with said worm, means to fully journal the end portions of said quill in said base section, and at both sides of the worm gear, pull head shaft sections extending into the ends of the quill, and removable therefrom, means to journal the inner ends of said line shaft section within the quill, means to journal said line shaft sections to the upper portion of the base section with removable bearings therefor, clutch means between the ends of the quill and the adjacent shaft sections, said clutch means being between each quill end and the last mentioned bearing means for the shaft section, together with a removable cover section for said device, and including means to secure the line shaft bearings in place, substantially as described.

7. In a device of the class described, the combination of a base section, a line shaft section extending transversely of said base section and fully journalled therein, a worm on said line shaft section, a quill above said line shaft section and worm, and extending transversely with respect thereto, a worm gear on said quill meshing with said worm, means to fully journal the end portions of said quill in said base section, and at both sides of the worm gear, pull head shaft sections extending into the ends of the quill, and removable therefrom, means to journal the inner ends of said pull head shaft sections within the quill, means to journal the pull head shaft sections at points outside of the quill, clutch means between each end of the quill and the adjacent pull head shaft section, together with a removable cover section for said part, substantially as described.

8. In a device of the class described, the combination of a base section, a line shaft section extending transversely of said base section, and fully journalled therein, a worm on said line shaft section, a quill above said line shaft section and worm, and extending transversely with respect thereto, a worm gear on said quill meshing with said worm, means to fully journal the end portions of said quill in said base section, and at both sides of the worm gear, pull head shaft sections extending into the ends of the quill, and removable therefrom, means to journal said pull head shaft sections with respect to the base section, clutch means between the ends of the quill and the adjacent shaft sections, together with a removable cover section for said parts, substantially as described.

FREDERICK H. HOGE.